(12) United States Patent
Cervantez et al.

(10) Patent No.: US 6,830,250 B2
(45) Date of Patent: Dec. 14, 2004

(54) DIRECTION/DISTANCE SENSING VEHICLE FUNCTION CONTROL SYSTEM

(75) Inventors: Jesse W. Cervantez, Navarre, OH (US); Jay D. White, Massillon, OH (US); Richard R. Steiner, N. Canton, OH (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 10/230,016

(22) Filed: Aug. 28, 2002

(65) Prior Publication Data

US 2003/0050749 A1 Mar. 13, 2003

Related U.S. Application Data

(60) Provisional application No. 60/323,026, filed on Sep. 12, 2001.

(51) Int. Cl.[7] ............................................... B62D 61/12
(52) U.S. Cl. .............................. 280/5.501; 324/207.25; 280/86.5; 280/149.1; 180/209
(58) Field of Search ............. 324/207.25; 280/DIG. 14, 280/5.501, 86.5, 149.1, 69.151, 6.157; 340/463, 431, 466, 471; 73/490; 180/272, 209

(56) References Cited

U.S. PATENT DOCUMENTS

| | | | | |
|---|---|---|---|---|
| 3,559,205 A | * | 1/1971 | Colby | ......................... 340/575 |
| 3,728,676 A | * | 4/1973 | Brown | ......................... 340/463 |
| 3,827,024 A | * | 7/1974 | Anderson et al. | ............ 340/463 |
| 3,941,203 A | * | 3/1976 | Leconte | ....................... 180/197 |
| 4,364,011 A | * | 12/1982 | Bloomfield et al. | ......... 324/174 |
| 4,816,998 A | * | 3/1989 | Ahlbom | ......................... 701/23 |
| 5,132,665 A | * | 7/1992 | Hutchisson et al. | ......... 340/463 |
| 5,175,415 A | * | 12/1992 | Guest | ......................... 235/95 R |
| 5,381,090 A | | 1/1995 | Adler et al. | |
| 5,630,604 A | | 5/1997 | Ducote | |
| 5,630,625 A | | 5/1997 | Shaw | |
| 6,112,845 A | | 9/2000 | Oyama | |
| 6,572,124 B2 | * | 6/2003 | Mlsna et al. | ................ 280/86.5 |
| 6,646,432 B1 | * | 11/2003 | Malinowski | ................. 324/171 |

FOREIGN PATENT DOCUMENTS

| | | |
|---|---|---|
| DE | 195 44 622 C1 | 11/1995 |
| WO | WO 96/22536 | 7/1996 |
| WO | WO 01/45991 A1 | 6/2001 |

* cited by examiner

Primary Examiner—Ruth Ilan
(74) Attorney, Agent, or Firm—Buckingham, Doolittle & Burroughs, LLP; David P. Dureska

(57) ABSTRACT

A system for automatically and simultaneously controlling one or more vehicle functions by detecting the direction of movement of and the distance traveled by the vehicle. The control system includes an electronic sensor mounted on a selected one of the vehicle axles adjacent to and facing an anti-lock braking system tone ring of a selected one of the wheel hubs mounted on the axle. The sensor is electrically connected to an electronic control unit, which in turn is electrically connected to a vehicle function actuation device such as a lift axle solenoid or back-up alarm actuation device. The sensor transmits direction and distance information to the electronic control unit based on the movements of a plurality of teeth formed on the tone ring. The control system is a stand-alone system that is free of interfacing with other vehicle systems, such as the anti-lock braking system.

7 Claims, 2 Drawing Sheets

DIRECTION/DISTANCE SENSING VEHICLE FUNCTION CONTROL SYSTEM

CROSS-REFERENCE TO RELATED APPLICATION

This application claims the benefit of U.S. Provisional Patent Application Ser. No. 60/323,026, filed Sep. 12, 2001.

BACKGROUND OF THE INVENTION

1. Field of the Invention

The invention relates to a direction/distance sensing system for a vehicle, and in particular to a stand-alone direction/distance sensing system used to control selected vehicle functions based on the sensed information. More particularly, the invention is directed to an electronic sensor mounted adjacent to the anti-lock braking system tone ring of a vehicle wheel hub, which is capable of determining the direction and distance of travel of the vehicle by sensing the movement of teeth formed on the tone ring, thereby electronically controlling, via a microcontroller which receives the sensed information, one or more selected vehicle functions, including lifting axles, activating safety backup alarms, reinflating suspension air springs, reengaging slider locking pins, disengaging dock ride-height maintenance devices, and the like.

2. Background Art

In recent years, a need has arisen in the heavy-duty vehicle industry due to conveniences desired by users as well as by government-regulated safety requirements. This need is the desire to increasingly automate various functions in heavy-duty vehicles such as semi-trailers and straight trucks. Such automation provides convenience by eliminating the need to manually control selected vehicle functions, and provides a safety feature by ensuring that the function occurs thereby preventing operator error due to forgetting to manually actuate a function that could result in damage to the vehicle or other property, or injury or death to people.

A specific example of one such vehicle function is the control of a self-steering lift axle on the trailer of a semi-trailer, which historically has been accomplished by a pneumatic control device mounted on the trailer. When the vehicle driver wanted to lift or lower the self-steering axle, he/she heretofore has been required to exit the truck cab to manually operate the control. It is desirable to lift a self-steer axle before backing up the vehicle since such self-steer axles only operate properly when the vehicle is moving forward. If the driver forgets to lift the self-steer axle before backing up, tire damage can result.

With the direction/distance sensing vehicle function control system of the present invention, the driver can automatically control the lift axle by moving the semi-trailer a predefined distance in reverse or forward. Specifically, when the semi-trailer moves a short, predefined distance, such as three feet in reverse, the self-steering lift axle is automatically raised by the control system to enable easier maneuvering of the vehicle, such as when the vehicle is being backed up to a loading dock. Conversely, when the semi-trailer moves a longer, predefined distance, such as 80 feet in the forward direction to ensure that it is no longer in a maneuvering mode and is beginning over-the-road travel, the self-steering lift axle is automatically lowered.

The present invention thus eliminates the need for such manually-actuated vehicle function control systems, by mounting an electronic sensor adjacent to the vehicle wheel hub tone ring on one of the non-steer axles, for sensing movement of the tone ring teeth and sending an electronic direction/distance signal to an electronic control unit, which in turn sends an electronic signal to a device which actuates the vehicle function, such as a solenoid for a lift axle.

SUMMARY OF THE INVENTION

Objectives of the present invention include providing a discrete system for automatically and simultaneously controlling one or more vehicle functions.

Another objective of the present invention is to provide such a system which is easy to install either as original equipment or as a retrofit on a vehicle, and which is lightweight, cost effective, durable in use, and easy to maintain and replace.

These objectives and advantages are obtained by the present invention characterized as a vehicle having a plurality of rotating wheels, the vehicle including means for sensing a direction of movement of and a distance of travel of a selected one of the plurality of wheels, means for processing the sensed direction and distance information, the processing means being electrically connected to the sensing means, and means for actuating at least one vehicle function, the actuation means being electrically connected to the processing means and being controlled by the processing means for automatically causing the function to occur.

BRIEF DESCRIPTION OF THE DRAWINGS

Similar numerals refer to similar parts throughout the drawings.

DESCRIPTION OF THE PREFERRED EMBODIMENT

Figure 1:
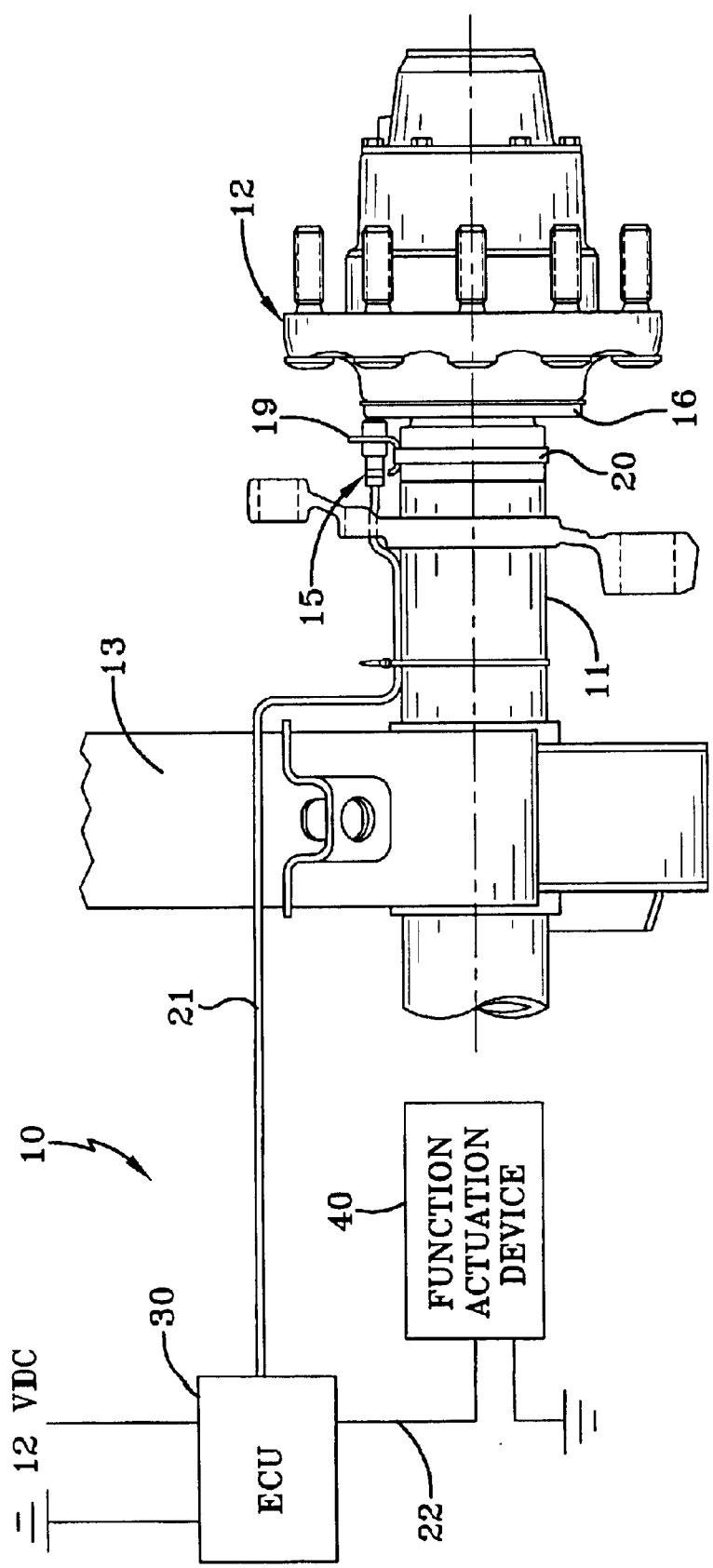
FIG. 1 is a bottom fragmentary view of the end of a semi-trailer non-steer axle, showing the beam which suspends the axle from the vehicle frame and the wheel hub mounted on the axle end, and further showing a sensor mounted adjacent to the wheel hub tone ring with the sensor shown in schematic form electronically connected to an electronic control unit, which in turn is electronically connected to a device for actuation of the selected vehicle function.
Figure 2:
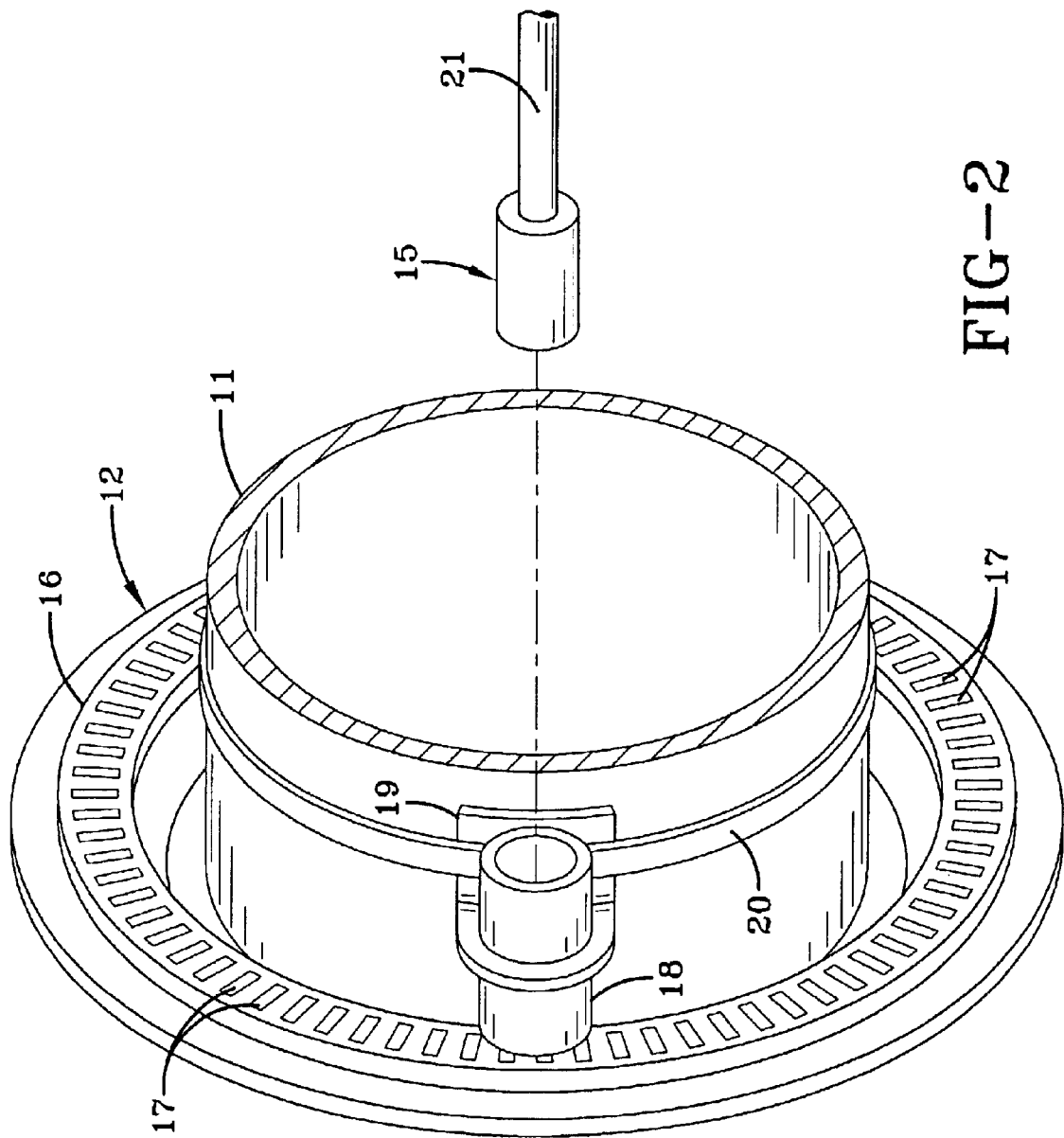
FIG. 2 is a fragmentary perspective view, with portions in section, of the wheel hub tone ring and axle of FIG. 1, and further showing in exploded format the manner in which the electronic sensor is mounted on the axle adjacent to the tone ring teeth.

The direction/distance sensing vehicle function control system of the present invention is indicated generally at 10, and is shown in FIG. 1 mounted on a vehicle. More particularly, control system 10 is shown mounted in one preferred environment in which it can be utilized, that is, on a non-steer axle 11 of the trailer of a semi-trailer (not shown). Non-steer axle 11 is suspended from and below the trailer frame (also not shown) by a suspension beam 13 which is well-known in the semi-trailer art. A wheel hub 12 in turn is mounted on each end of axle 11 (only one end of axle 11 shown). Wheel hub 12 includes an antilock braking system (hereinafter "ABS") tone ring 16 formed with a plurality of inboardly facing teeth 17 (FIG. 2).

In accordance with one of the important features of the present invention, an electronic direction/distance sensor 15, preferably of the Hall effect type which is well-known in the art, is mounted on axle 11 adjacent to and facing wheel hub tone ring teeth 17. Sensor 15 is cylindrical-shaped and is mounted in a cylindrical-shaped sleeve 18 by any suitable means such as an interference fit, so that the sensor is positioned to detect the movement of tone ring teeth 17 created by equally-spaced openings or recessions formed in the tone ring. Sleeve 18 in turn is secured to a bracket 19 by any suitable means, such as welding, and the bracket in turn is mounted on axle 11 such as by a band clamp 20.

An electrical conduit or cable 21 extends from the inboard end of sensor 15 and electrically connects the sensor to an electronic control unit 30 (hereinafter "ECU") for establishing electronic communication between the sensor and the ECU. ECU 30 consists of a microcontroller, a voltage regulator, relays, and various electronic circuitry as is well-known to those skilled in the art, and is mounted on any convenient trailer location. ECU 30 in turn is electrically connected via a cable 22 to a device 40 for actuating a function to be performed on the vehicle, such as a solenoid for actuating lifting of an axle.

A lift axle application for direction/distance sensing vehicle function control system 10 of the present invention now will be described. Sensor 15 provides direction and distance information to ECU 30 based on the movements of tone ring 16. More specifically, electronic sensor 15 transmits a direction signal to ECU 30 indicating if the vehicle is moving forward or reverse. Sensor 15 also provides a distance signal to ECU 30, which correlates with the number of sensed teeth 17 between openings or recessions on tone ring 16. ECU 30 receives power and ground from the vehicle's wiring harness and controls lift axle solenoid 40, which in turn controls the amount of compressed air supplied to the lift bags and ride bags or air springs (both not shown) of a self-steering semi-trailer axle for lifting or lowering the axle.

More specifically, when the semi-trailer moves a short predefined distance, such as 3 feet in reverse, sensor 15 detects this direction/distance combination and transmits the information via electrical cable 21 to ECU 30, which in turn transmits a signal via electrical cable 22 to lift axle solenoid 40 causing the self-steering lift axle (not shown) to automatically raise to enable easier maneuvering of the vehicle, such as when the vehicle is being backed up to a loading dock. When the semi-trailer moves a longer, predefined distance, such as 80 feet in the forward direction to ensure that it is no longer in a maneuvering mode and is beginning over-the-road travel, sensor 15 again detects this direction/distance combination and transmits the information via electrical cable 21 to ECU 30, which in turn transmits a signal via electrical cable 22 to lift axle solenoid 40 causing the self-steering lift axle to automatically lower.

The reason for liftable axles is that self-steering axles are designed to be self-steering when the vehicle moves in the forward direction. There are typically two kinds of self-steering lift axles, the in-line kingpin type and the leading kingpin type, and the present invention can be utilized on both. The basic steering geometry that enables the axle to self-steer while going forward also causes the steering to be unstable when the vehicle is maneuvered backwards. Because of the difficulties involved in adapting the steering mechanisms to remain stable in the reverse direction, it is more advantageous to simply lift the axle. Lifting one or more axles when maneuvering in reverse reduces scrubbing of the tires, especially in tight turns. Moreover, by lifting the steer axle, it is prevented from kicking sideways and being drug a significant distance rearward doing damage to the tires when the vehicle is moving against the intended steer direction. The automatic lift feature facilitated by the present invention also may be used on multiple axle trailers with wide spacing between the axles.

An additional feature of the present invention is that sensing control system 10 can count the number of teeth 17 moving forward and compare that number with the number of the teeth moving in reverse, and when the number of teeth going forward is greater than the number of teeth going in reverse, the reverse tooth counter is reset to zero to avoid inadvertent lift of the axle, such as when the vehicle briefly drifts backwards just before starting to move forward after being stopped on an upward incline. The same zero reset also applies to the forward direction to avoid inadvertent drop of the axle.

It is understood the present invention clearly contemplates uses of direction/distance sensing control system 10 to activate/deactivate a back-up safety alarm, to reinflate suspension air springs after they have been deflated for a maneuvering operation, to reengage slider locking pins after they have been disengaged to reposition the slider, disengage a ride-height maintenance device after a trailer has been loaded or unloaded at a dock, and for other functions on heavy-duty semi-trailers or trucks and even on other types of vehicles such as cars, where a stand-alone system is desired to automatically control one or a plurality of vehicle functions. It is further understood that any type of sensor 15 could be used in the present invention without affecting its overall concept, so long as the selected sensor can transmit direction and distance information, whether from a tone ring or from some other moving part or parts on the vehicle. Moreover, ECU 30 can take many forms so long as it is capable of processing the direction/distance information and sending it to function actuation device 40. It is understood that single sensor 15 and electrically connected ECU 30 shown in the drawings and described hereinabove, can be used to control multiple function actuation devices 40 for controlling various vehicle functions simultaneously. This is accomplished without interfacing control system 10 with other vehicle systems, such as the anti-lock braking system.

Accordingly, the direction/distance sensing vehicle function control system of the present invention is simplified, provides an effective, safe, inexpensive and efficient system which achieves all of the enumerated objectives, provides for eliminating difficulties found in prior art manual control systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved direction/distance sensing vehicle function control system is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A vehicle having a plurality of rotating wheels, said vehicle including:

a) a Hall effect sensor, said sensor being mounted on an axle of said vehicle adjacent to a wheel hub of a selected one of said plurality of wheels rotatably mounted on said axle, said wheel hub including an anti-lock braking system tone ring formed with a plurality of teeth, the sensor detecting the direction of movement of said teeth and the number of the teeth moving in said direction, for in turn sensing a direction of movement of and a distance of travel of said selected one of the plurality of wheels;

b) means for processing said sensed direction and distance information, said processing means being electrically connected to said sensor; and c) means for actuating at least one vehicle function, said actuation means being electrically connected to said processing means and being controlled by the processing means for automatically causing said function to occur.

2. The vehicle of claim 1, in which said processing means is an electronic control unit which includes a microcontroller.

3. The vehicle of claim 2, in which said electronic control unit is electrically connected to at least one actuating means.

4. The vehicle of claim 2, in which said electronic control unit is electrically connected to and simultaneously controls a plurality of actuating means.

5. The vehicle of claim 1, in which said actuating means is operatively connected to and actuates a vehicle structure capable of performing a certain vehicle function.

6. A method for automatically activating at least one vehicle function, said vehicle having a plurality of rotating wheels, said method including the steps of:

a) detecting a direction of movement of and a distance of travel of a selected one of said plurality of wheels by sensing means, said sensing means detecting said direction and distance information from the movement of a plurality of teeth formed on an anti-lock braking system tone ring of a wheel hub of said selected wheel;

b) electronically transmitting said detected direction and distance information from said sensing means to a microcontroller; and c) electronically transmitting a signal from said microcontroller to actuating means for activating said vehicle function.

7. The method of claim 6, in which a plurality of vehicle functions are simultaneously activated.

* * * * *